T. H. SORLIEN.
CAMP TRAILER.
APPLICATION FILED APR. 3, 1916.

1,235,733.

Patented Aug. 7, 1917.
5 SHEETS—SHEET 1.

WITNESSES
E.C. Wells
A. H. Opsahl

INVENTOR.
Theodore H. Sorlien
BY HIS ATTORNEYS

T. H. SORLIEN.
CAMP TRAILER.
APPLICATION FILED APR. 3, 1916.

1,235,733.

Patented Aug. 7, 1917.
5 SHEETS—SHEET 2.

WITNESSES
E. C. Wells
A. H. Opsahl

INVENTOR
Theodore H. Sorlien
BY HIS ATTORNEYS
Williamson & Merchant

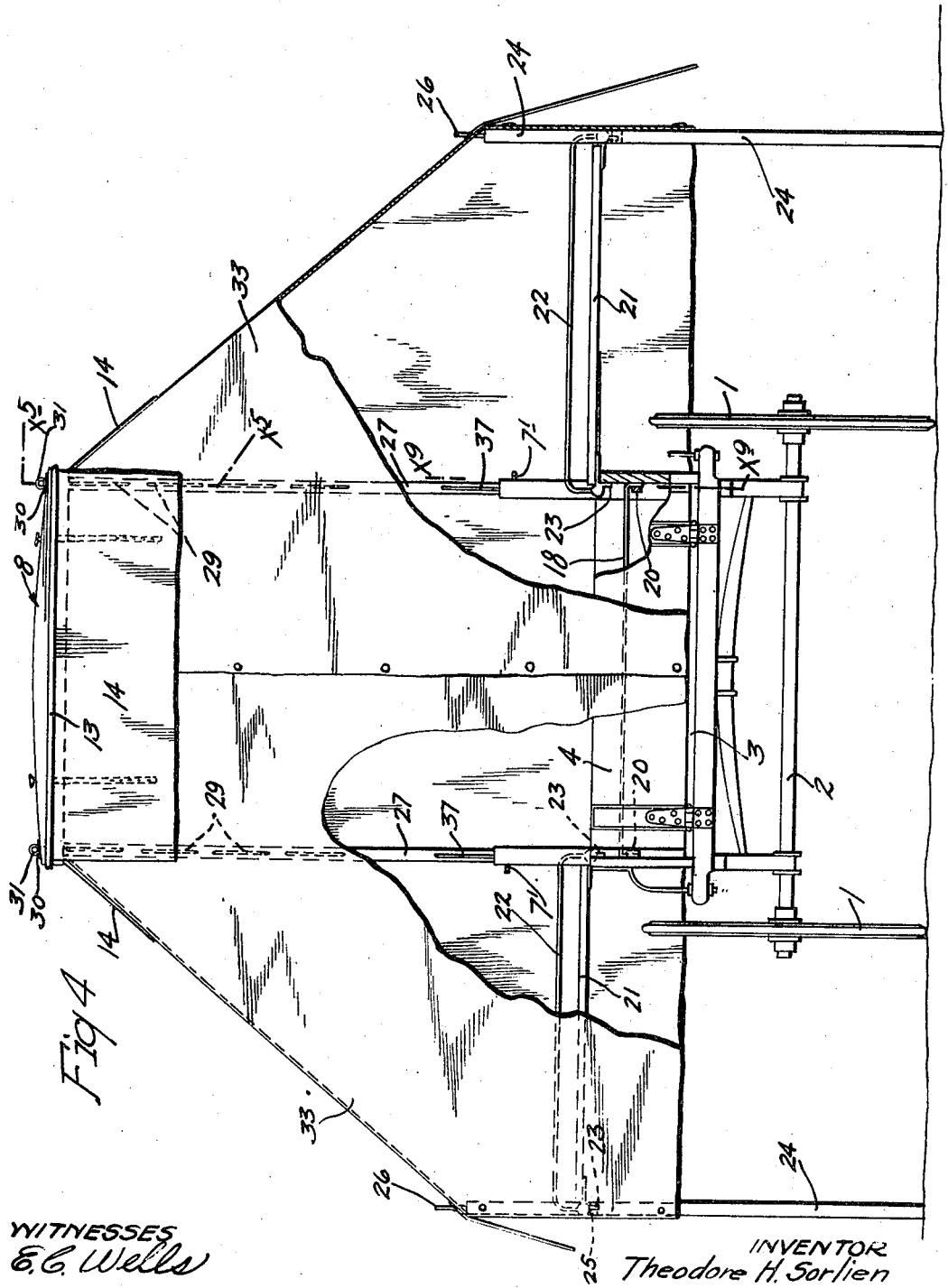

T. H. SORLIEN.
CAMP TRAILER.
APPLICATION FILED APR. 3, 1916.
1,235,733.
Patented Aug. 7, 1917.
5 SHEETS—SHEET 4.
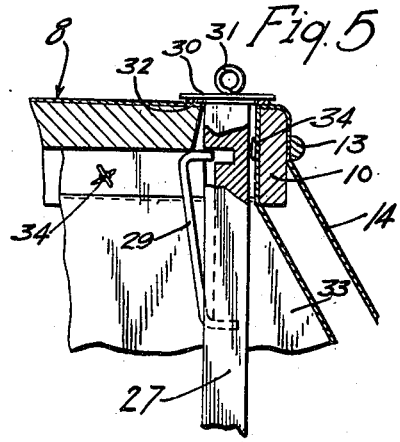
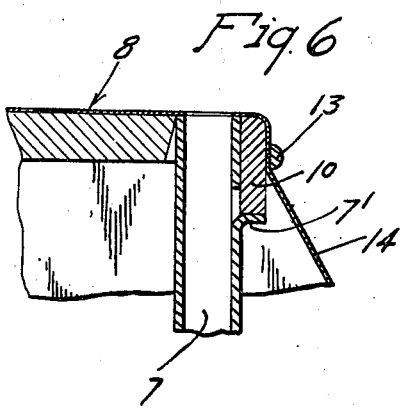
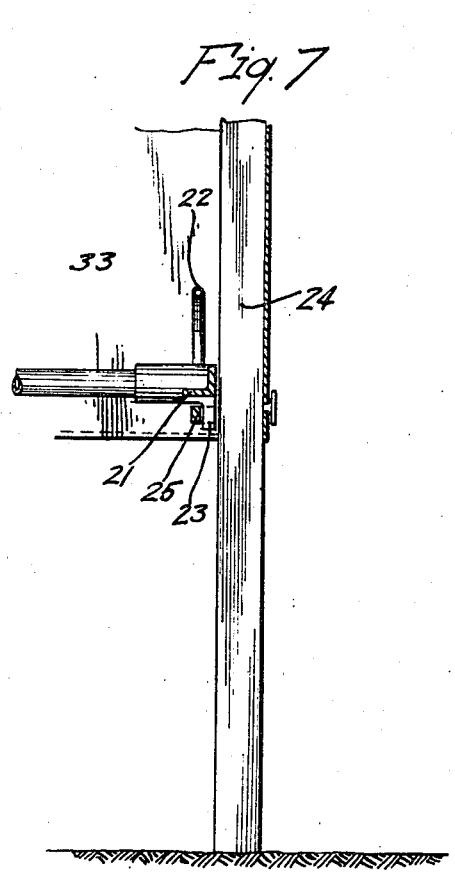
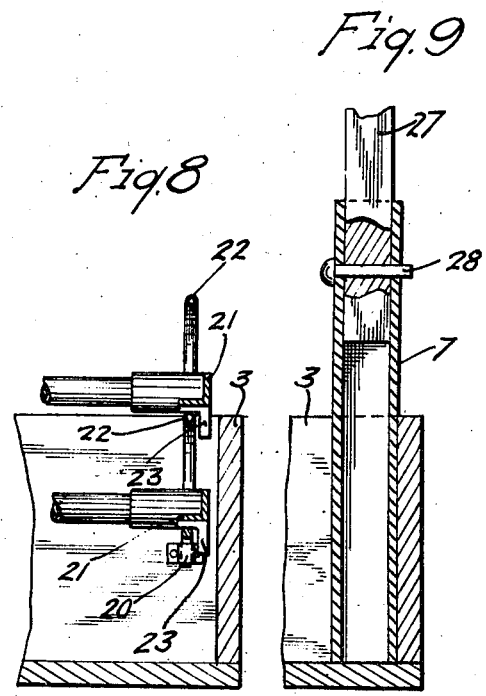
WITNESSES
E. C. Wells
U. H. Opsahl
INVENTOR
Theodore H. Sorlien
BY HIS ATTORNEYS T. H. SORLIEN.
CAMP TRAILER.
APPLICATION FILED APR. 3, 1916.
1,235,733.
Patented Aug. 7, 1917.
5 SHEETS—SHEET 5.
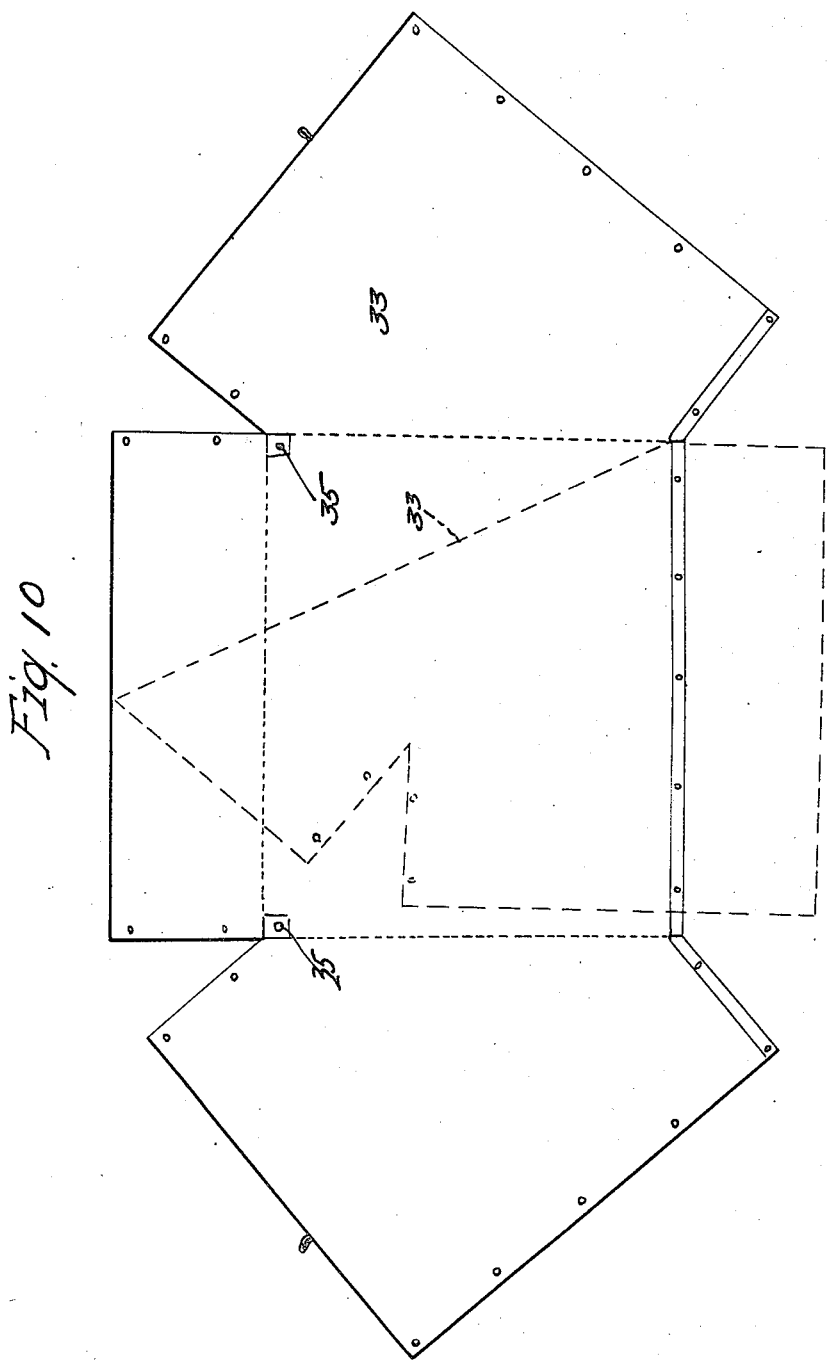
WITNESSES
E. C. Wells
U. H. Opsahl
INVENTOR
Theodore H. Sorlien
BY HIS ATTORNEYS
Williamson & Merchant

UNITED STATES PATENT OFFICE.

THEODORE H. SORLIEN, OF MINNEAPOLIS, MINNESOTA.

CAMP-TRAILER.

1,235,733.

Specification of Letters Patent.

Patented Aug. 7, 1917.

Application filed April 3, 1916. Serial No. 88,507.

*To all whom it may concern:*

Be it known that I, THEODORE H. SORLIEN, a citizen of the United States, residing at Minneapolis, in the county of Hennepin and State of Minnesota, have invented certain new and useful Improvements in Camp-Trailers; and I do hereby declare the following to be a full, clear, and exact description of the invention, such as will enable others skilled in the art to which it appertains to make and use the same.

My invention relates to improvements in vehicle trailer camping outfits; and, to this end, it consists of the novel devices and combinations of devices hereinafter described and defined in the claims.

In the accompanying drawings, which illustrate the invention, like characters indicate like parts throughout the several views.

Referring to the drawings,

Fig. 4 is a rear end elevation of the parts shown in Fig. 3, with some parts broken away and some parts shown in section;

Fig. 5 is a detail view, principally in vertical section taken on the line $x^5$ $x^5$ of Fig. 4;

Fig. 6 is a detail view in vertical section illustrating certain of the parts shown in Fig. 5, as they appear when the top is lowered.

Fig. 7 is a detail view, principally in vertical section taken on the line $x^7$ $x^7$ of Fig. 3, on an enlarged scale;

Fig. 8 is a detail view in section taken on the line $x^8$ $x^8$ of Fig. 2, on an enlarged scale;

Fig. 9 is a detail view in vertical section taken on the line $x^9$ $x^9$ of Fig. 4, on an enlarged scale, some parts being shown in different positions by means of broken lines; and Fig. 10 is a plan view of one of the tent sections on a small scale and illustrating, by means of broken lines, the method of folding the same.

Figure 1:
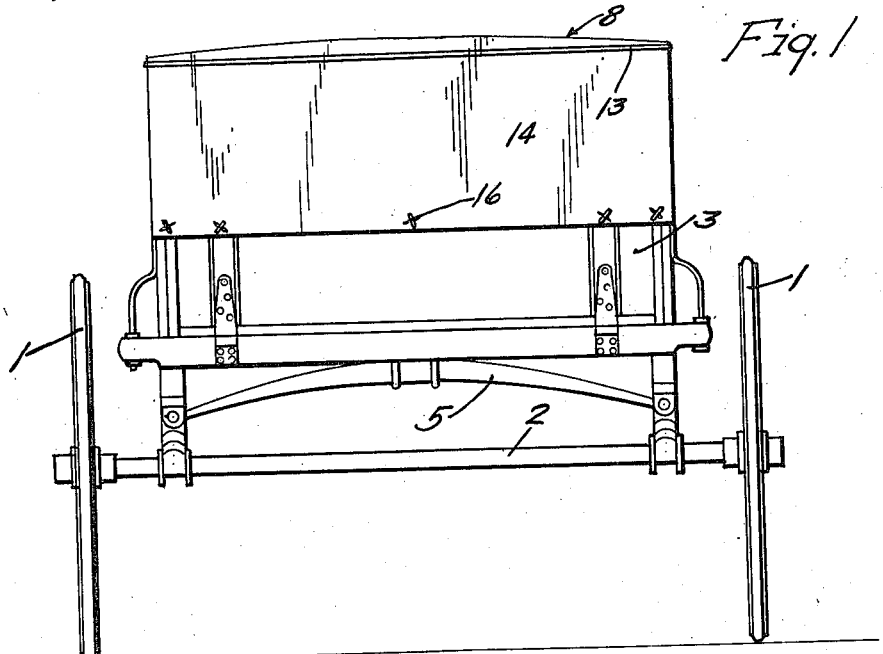
Figure 1 is a rear end elevation of the trailer with the camp outfit packed.
Figure 2:
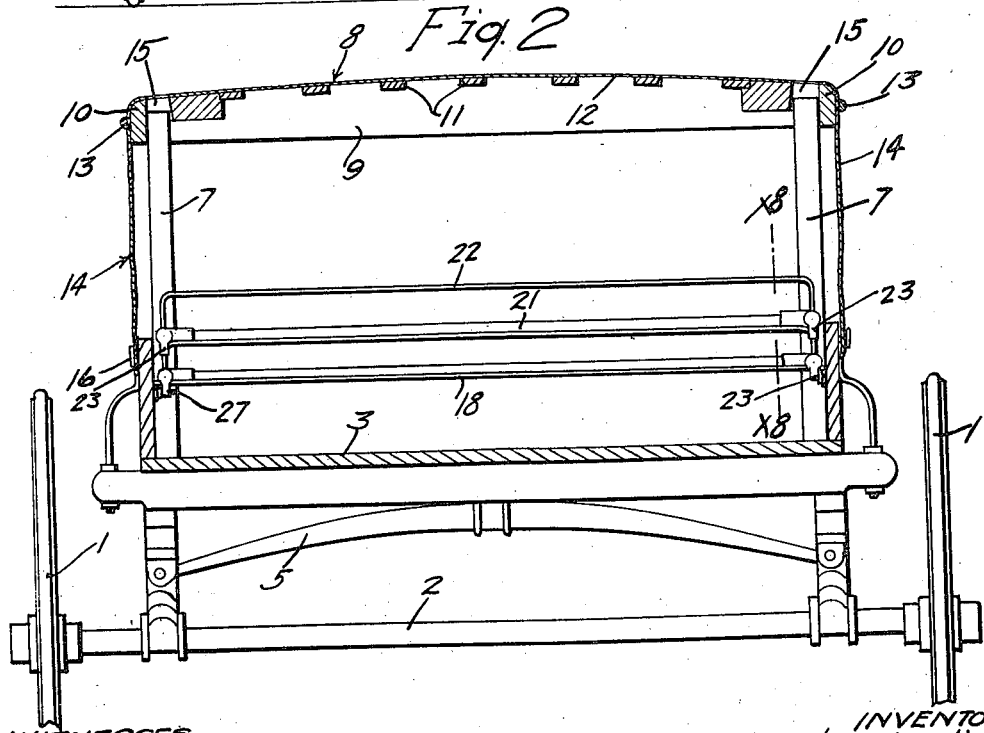
Fig. 2 is a transverse vertical section of the same.

The trailer, which is of the two-wheeled type, comprises a pair of wheels 1, an axle 2, a box-like body 3 having a hinged endgate 4, springs 5 supporting the body 3 from the axle 2, and a stub pole 6, detachably connected by a suitable coupling, not shown, to an automobile or other vehicle.

In each corner of the body 3, is detachably secured, by any suitable means, a vertically extended socket member 7 in the form of a metallic tube, square in cross section and extending considerably above the body 2. A vertically adjustable canopy top 8 is provided for the trailer and camp outfit. This top 8 comprises a rigid skeleton frame made up of end and intermediate members 9, side members 10 and slats 11, over which frame is stretched a waterproof covering 12. The marginal edges of this covering 12 extend downward onto the end members 9 and side members 10, are tacked, or otherwise secured, thereto and its edges are covered by a molding 13.

Side and end curtains 14 have their upper horizontal edges secured to the top 8 under the molding 13. When the camp outfit is folded or packed, the canopy top 8 removably rests on horizontal lugs 7', pressed from the socket members 7 and located near the upper ends thereof. The upper ends of the socket members 7, above the lugs 7', extend into vertical openings 15 formed in the side members 10 of the top 8. Obviously, these connections between the socket members 7 and top 8 hold said top against horizontal movement, with respect to the vehicle. When the top 8 is supported on the socket members 7, the curtains 14 overlap the side and end walls of the body 3, are detachably secured thereto by separable fasteners 16 and completely incase said body. The canopy top 8 is sloped from its longitudinal center toward each side of the vehicle, in order to shed water.

Front and rear horizontal bed supporting rails or rods 17 and 18, respectively, extend transversely of the body 3, above the bottom thereof, and are anchored to the sides of said body. The ends of the rods 18 are bent laterally downward and are removably seated in anchor plates 20 secured to the inner faces of the sides of the body 3. By thus removably mounting the rod 18, the same may easily be removed, so as to not obstruct the body 3, when the camping outfit is removed therefrom, and especially when the endgate 4 is let down.

Included in the camp outfit is a pair of bed springs 21, each having, as shown, a metal frame and head and foot rails 22.

On each end casting of the frames of the bed springs 21 is a depending lug 23. The size of the body 3 is such as to snugly receive the bed springs 21 in horizontal positions, one above the other, with the lower bed spring 21 resting on the rods 17 and 18 and the upper thereof resting on the head and foot rails 22 of the lower bed springs 21. In this position of the bed springs 21, the lugs 23 of the lower bed springs 21 extend outward of the rods 17 and 18 and the lugs 23 of the upper bed spring 21 extend outward of the head and foot rails 22 of the lower bed spring 21 and hold the bed springs 21 against horizontal endwise movement toward the front or rear of the vehicle.

Fig. 4 shows the camping outfit set up, and it will be noted that the top 8 has been raised and the bed springs 21 projected into operative positions, one on each side of the body 3. In this position of the bed springs 21, it will be noted that their inner portions rest on the upper edges of the sides of the body 3 and that the lugs 23 on the inner castings of the bed springs 21 engage the sides of the body 3 and limit the extended movements of the bed springs. Each bed spring 21 is supported, at its outer portion, by a pair of long ground-engaging legs 24, having anchor plates 25 to receive the adjacent lugs 23 and detachably support the outer portions of the bed springs 21 therefrom. The upper ends of the legs 24 project above the bed springs 21 and have secured to their upper ends upwardly extended pins 26, the purpose of which will presently appear.

Corner posts 27 are provided for supporting the top raised, as shown in Fig. 4. These posts 27 are removably telescoped through the openings 15 into the top and into the socket members 7, before the top is raised. Each post 27 is locked against endwise movement in its respective socket member 7 by a pin 28 passed through alined holes formed in said socket members and posts. The holes in the posts 27 register with the holes in the socket members 7, only when said posts are in their lowermost positions. After the posts 27 are secured in the socket members 7 against lifting movement, the top 8 is raised thereon. A plurality of longitudinally spaced spring latches 29 on each post 27 are provided for supporting the top 8 on the post 27 in different vertical adjustments, so that said top may be raised bodily by lifting the same a short distance at a time or lifting one corner thereof at a time. These spring latches 29 are arranged to yield when engaged by the top, during the lifting movement thereof, but prevent lowering movement thereof, except when pressed into inoperative position. The uppermost set of these spring latches 29 holds the canopy top 8 in its uppermost position, with its upper surface substantially flushed with the tops of the posts 27.

On the top of each post, is secured a cap 30 having an eye 31. These caps 30 cover the openings 15 in the top 8, when raised, and flashings 32 are interposed between the caps 30 and top 8 to form water-tight joints therebetween. The flashings 32 are preferably permanently secured to the top 8 and completely surround the openings 15 therein. Guy ropes, not shown, may be attached to the eyes 31 to assist in steadying the top 8.

Figure 3:
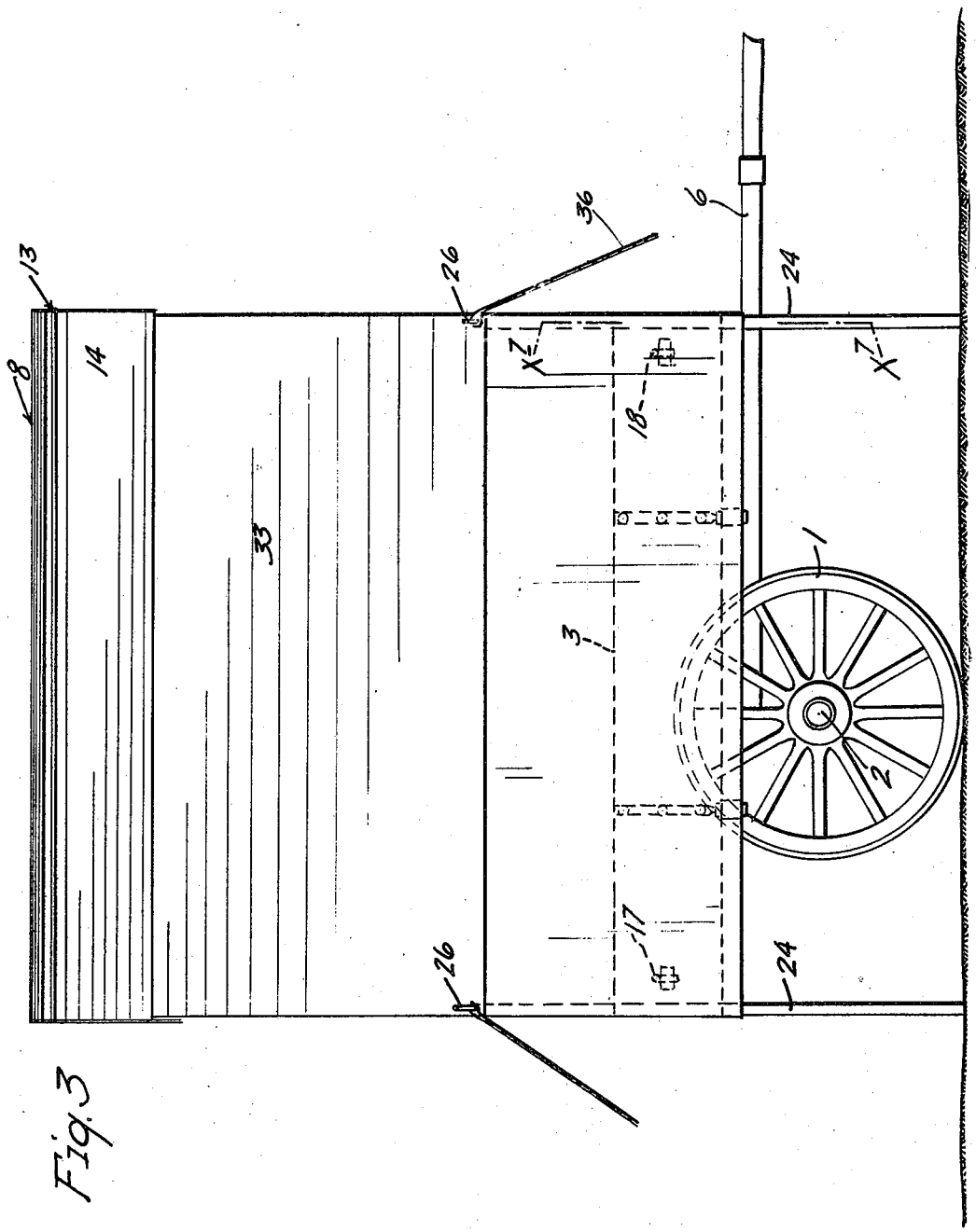
Fig. 3 is a side elevation of the trailer with the camp outfit set up, some parts being broken away.

A tent 33, preferably made in two sections, is provided, together with the top 8, for inclosing the trailer and the bed springs 21, when extended, as shown in Figs. 3 and 4. The tent is of the wall type and the ridges of the sections thereof are secured by separable fasteners 34 to the inner faces of the side members 10. The ground-engaging legs 24 afford the supports for the tent at the corners thereof and the pins 26 project through reinforced openings 35, formed in the tops of the tent sections.

Guy ropes 36 anchored to the pins 26 are provided for holding the legs 24 in upright positions. After the canopy top 8 is raised to its highest point on the posts 27, the same may be supported in a still higher position by removing the pins 28, lifting the posts 27 in the socket members 7 and supporting the same from the upper edges of said socket members by a set of spring latches 37. These spring latches 37 are identical with the spring latches 29, with the exception that they are secured to the posts 27 in reversed order. To lower the posts 27 in the socket members 7, the spring latches 37 are pressed into inoperative positions and held in these positions by the socket members 7, when the posts 27 are lowered therein, (see Fig. 9).

From the above description, as to the raising and lowering of the canopy top 8, it is evident that one man can do the work by lifting one end or one corner thereof, at a time. The initial lifting movement of the top 8 on the posts 27 comes within easy reach of the operator, and the final lifting movement thereof is accomplished by raising the posts 27 in the sockets 7.

In packing the camp outfit, one of the bed springs 21 is first detached from the respective legs 24, slid into the body 3 on the respective side thereof, and on the rails 17—18. In the same manner, the second bed spring 21 is then moved into the body 3, with the exception that it slides on the head and foot rails 22 of the lower bed spring 21. The canopy top 8 is next lowered by first releasing the spring latches 37, lowering the posts 27 in the socket members 7, and lowering the top 8 bodily, by means of the spring latches 29, until the same rests on the socket members 7. The flaps or ends of the tent sections 33 are then folded onto the bodies thereof and said tent sections rolled on the legs 24, beginning at their lower horizontal edges and rolling toward the top 8. The rolled tent sections are placed within the vehicle on the top bed spring 21, and finally, the side and end curtains 14 are secured to the body 3, by the separable fasteners 16, as shown in Fig. 1. It is, of course, understood that provisions and other camp necessities may be stored in the vehicle.

The camp outfit, when packed, as shown in Fig. 1, is very compact and has a neat appearance.

What I claim is:

1. The combination with a vehicle having a body, a top, and posts supporting the top from the body in different vertical positions, of a bed shiftable from a horizontal position under the top to a position at one side of the vehicle and supported in part therefrom, and legs assisting in supporting the bed.

2. The combination with a vehicle having a box-like body, a top, and posts supporting the top from the body in different vertical positions, of a pair of beds supported horizontally, the one above the other, within the box-like body and shiftable, one to each side of the vehicle, and supported in part therefrom, and legs assisting in supporting the beds.

3. The combination with a vehicle having a box-like body, of a shiftable bed adapted to be stored in said body or projected horizontally into an operative position at one side of the vehicle and supported in part therefrom, said bed having ground-engaging legs, and depending lugs on the bed, certain of the lugs arranged to engage said body to limit the projecting movement of the bed and others thereof arranged to interlock with said legs for detachably connecting the bed thereto.

4. The combination with a vehicle having a box-like body, of a pair of shiftable beds adapted to be stored in said body, one of said beds having head and foot rails upon which the other of said beds is supported, when stored, with freedom for horizontal sliding movement thereon over the upper edge of said body and into an operative position at one side of the vehicle.

5. The combination with a vehicle having a box-like body and a pair of supporting rails secured therein, of a pair of shiftable beds, each having head and foot rails for storing the one bed upon the other with freedom for horizontal sliding movement and with the lower bed resting on said supporting rails with freedom for horizontal sliding movement.

6. The combination with a vehicle having socket members secured to its body, of a vertically adjustable top supported directly on said socket members in one position and having interlocking engagement therewith against horizontal movement, and removable posts insertible in the socket members for supporting the top in another position.

7. The combination with a vehicle having socket members secured to its body, of a vertically adjustable top supported on said socket members in one position, posts insertible in the socket members for supporting the top in another position, and means for supporting the top on the intermediate portions of the posts in another position.

8. The combination with a vehicle having socket members secured to its body, of a vertically adjustable top supported on said socket members in one position and having interlocking engagement therewith against horizontal movement, posts insertible in the socket members for supporting the top in another position, means for vertically adjusting the top on the posts in other positions, and means for vertically adjusting the posts in the socket members.

9. The combination with a vehicle having socket members secured to its body, of a top having openings therein, posts arranged to be inserted through said openings and telescoped into the socket members, and means for supporting the top on the posts in a raised position.

10. The combination with a vehicle having socket members secured to its body, of a top having openings therein, posts arranged to be inserted through said openings and telescoped into the socket members, means for supporting the top on the posts in a raised position, and caps on the post for closing said openings when the top is raised.

11. The combination with a vehicle, of a vertically adjustable top, and curtains in endless arrangement carried by the top and adapted to be secured to the body of the vehicle when the top is lowered to afford a closure that is tight on all sides.

12. The combination with a vehicle, of a vertically adjustable top, curtains secured to the sides and ends of the top and adapted to be secured to the body of the vehicle when the top is lowered, and tent sections adapted to be secured to the top when raised and under the curtains thereof.

13. The combination with a vehicle having a body, a top, and posts supporting the top from the body in different vertical positions, of a bed shiftable from a horizontal position under the top to a position at one side of the vehicle, supported in part therefrom and held against endwise movement by the posts on the respective sides of the vehicle, and legs assisting in supporting the bed.

14. The combination with a vehicle having a body, a top, and posts supporting the top from the body in different vertical positions, of a bed shifted from a horizontal position under the top to a position at one side of the vehicle and supported in part therefrom, lugs on the bed arranged to engage the body to limit the lateral movement of the bed outward from the vehicle, and legs assisting in supporting the bed.

15. The combination with a vehicle having a body, a top, and posts supporting the top from the body in different vertical positions, of a bed shiftable from a position under said top to a position at one side of the vehicle and supported in part therefrom, legs assisting in supporting the bed, and a tent section secured to said top, extending over the bed and secured to said legs.

16. The combination with a vehicle having a body, a top, and posts supporting the top from the body in different vertical positions, of a pair of beds shiftable from a position, one upon the other under said top into position, one at each side of the vehicle and supported in part therefrom, legs assisting in supporting the bed, and tent sections secured to said top, extending over the bed and secured to said legs.

17. The combination with a vehicle having a body and a vertically adjustable top, of a bed shiftable from a horizontal position under the top to a position at one side of the vehicle and supported in part therefrom, and legs assisting in supporting the bed.

18. The combination with a vehicle having a box-like body and a pair of transverse rails secured therein and spaced above the bottom thereof, of a pair of beds supported, the one upon the other and upon said rails and shiftable, one to each side of the vehicle by a sliding movement, the uppermost on the lowermost and the lowermost on said rails.

In testimony whereof I affix my signature in presence of two witnesses.

THEODORE H. SORLIEN.

Witnesses:
H. A. SORLIEN,
HARRY D. KILGORE.